T. G. TAYLOR.
INSECT TRAP.
APPLICATION FILED FEB. 13, 1911.
1,031,827.
Patented July 9, 1912.
2 SHEETS—SHEET 1.
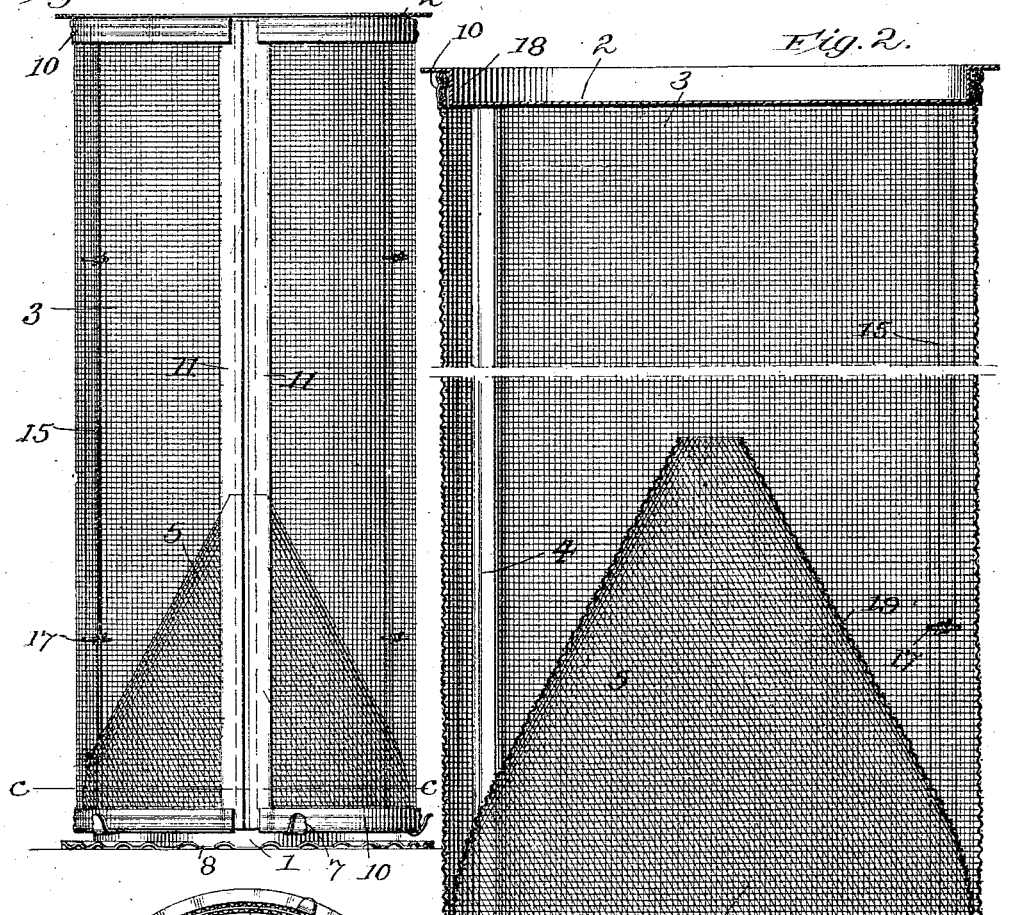

T. G. TAYLOR.
INSECT TRAP.
APPLICATION FILED FEB. 13, 1911.
1,031,827.
Patented July 9, 1912.
2 SHEETS—SHEET 2.
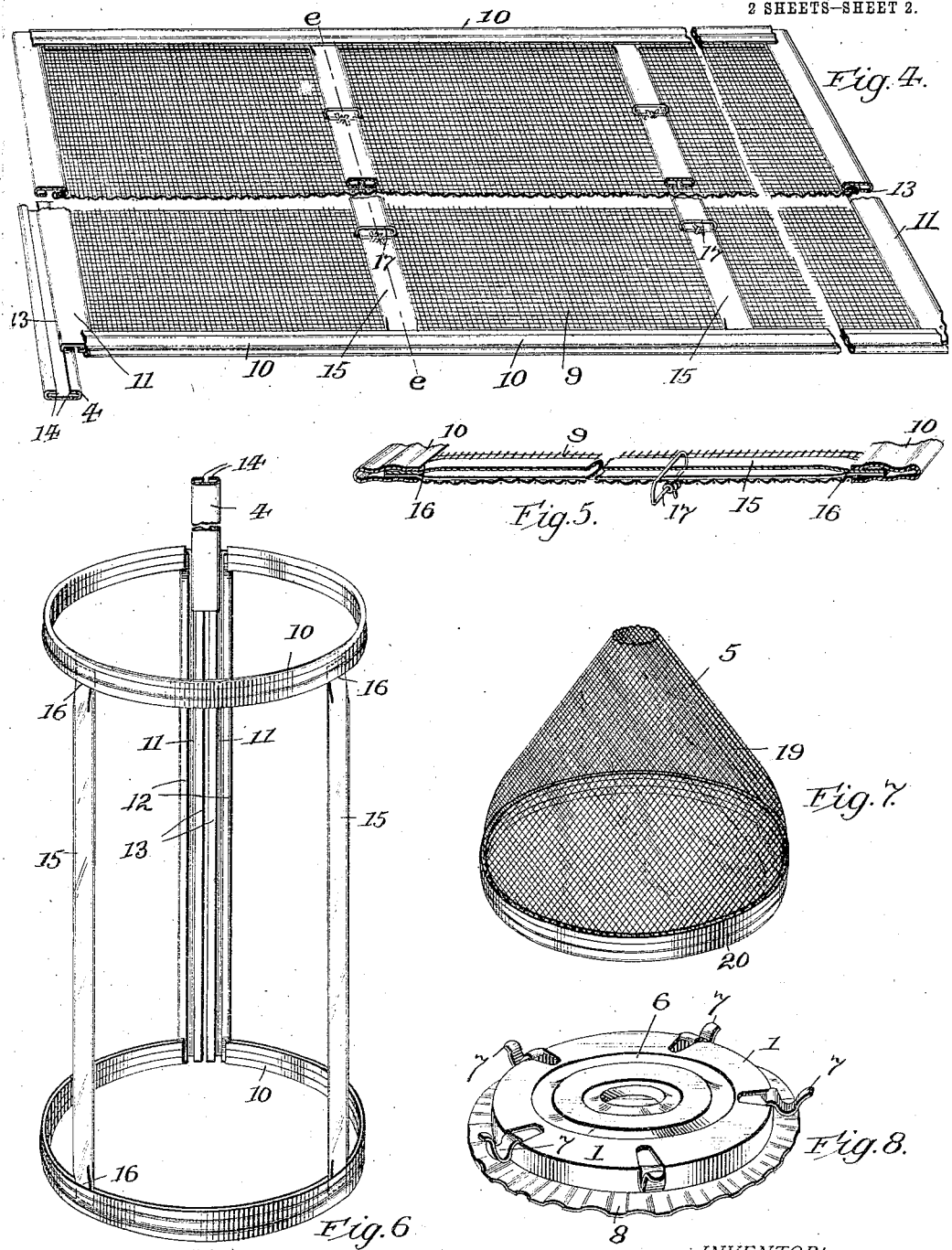
INVENTOR:
Thomas G. Taylor,
by Dodge and Sons,
Attorneys.

:::::::::::::::::::::::::::::::::::::::::::::::::::::::::::::::::::::::::::::

UNITED STATES PATENT OFFICE.

THOMAS G. TAYLOR, OF ST. LOUIS, MISSOURI.

INSECT-TRAP.

1,031,827.  Specification of Letters Patent.  Patented July 9, 1912.

Application filed February 13, 1911. Serial No. 608,297.

*To all whom it may concern:*

Be it known that I, THOMAS G. TAYLOR, a citizen of the United States, residing at St. Louis, in the State of Missouri, have invented certain new and useful Improvements in Insect-Traps, of which the following is a specification.

This invention relates to insect traps and particularly to a collapsible trap, which may be taken down for shipping and when set up is rigid and properly stayed, so as to withstand rough usage. The trap belongs to the well known funnel entrance type, and the invention resides in certain refinements and improvements whereby its efficiency as a trap and its strength and durability are increased.

In order to be effective, a fly trap must be made rather large, and unless some provision is made for packing the traps in a small space the shipping cost becomes prohibitive. Attempts have been made to construct collapsible traps but considerable difficulty has been experienced in securing sufficient strength to withstand hard usage, and my invention relates to the proper construction and bracing of such traps, whereby I secure a tight, rigid structure, in which each part braces the others, and in which the gauze of the trap is properly stayed so as to withstand the heat used in killing the flies.

The invention will be described in connection with the accompanying drawings, in which:—

Figure 1 is a side elevation of a trap constructed in accordance with my invention; Fig. 2 is an enlarged vertical section of the same; Fig. 3 is a section on the line *c—c* of Fig. 1; Fig. 4 is a perspective view of the structure forming the side of a trap showing the stays and the longitudinal joint. Fig. 5 is an enlarged sectional view on the line *c—c* of Fig. 4; Fig. 6 is a perspective view of the stays for the side of the trap showing the longitudinal joint, the wire gauze being omitted for clearness; Fig. 7 is a perspective view of the entrance funnel; and Fig. 8 is a perspective view of the base pan.

The trap consists of five essential parts, a base pan 1, a cap plate 2, the side walls 3, a locking strip 4 therefor, and the entrance funnel 5.

The base pan consists of a sheet metal stamping of circular form and convex upward. The pan is formed with annular depressions or troughs 6 in which molasses or the like may be placed as a bait, and ears 7 are stamped out adjacent the edge of the pan and are bent outward to form supporting hooks or lugs, as clearly indicated in Fig. 8. The rim 8 of the pan may be corrugated or may be given other fanciful or ornamental form.

The side walls of the trap consist of a sheet of wire gauze 9 reinforced around its edges with strips of sheet metal 10 and 11 folded upon themselves and crimped upon the edges of the gauze. The strips 10 form the hoop ends of the trap when set up and are merely bent to U-shape and crimped onto the gauze, but the strips 11 form the contacting edges of the side of the trap and are made of wider strips with their edges bent toward each other as at 12 and 13. The edge of the wire gauze 9 is also folded upon itself, inserted in one fold 12 of the strip 11 (see Fig. 3) and the two are crimped together. In this way the contacting edges of the wire gauze are provided with reinforcing strips 11 having one hook shaped edge 13 and these two hook shaped edges may be held together by the locking strip 4 having its edges 14 bent toward each other as clearly shown in the drawings. This strip is slid to position longitudinally and completely closes any gap between the strips 11. The gauze 9 is further braced by stays 15 of sheet metal. These also consist of narrow strips having their edges bent toward each other (see Fig. 5) and are held in place by having their ends crimped into the fold of the strips 10 as at 16. This crimping is effected at the time the wire gauze is crimped in, Fig. 6 being shown without the gauze merely to clearly indicate the form of the bracing. The gauze 9 is tied to the stays 15 by wire ties 17.

After the side wall of the trap has been locked in its cylindrical form by means of the strip 4, the cap plate 2 which consists of a dished sheet metal stamping having a cylindrical portion 18, is forced into one end. The portion 18 fits tightly into the reinforcing ring formed by a strip 10 so that the cap plate is retained by friction. Similarly the entrance funnel 5 is forced into the other end. This funnel consists of a cone 19 of wire gauze having a reinforcing ring 20 of sheet metal crimped around its base, and having a small aperture at its apex through which flies enter the trap. The entrance funnel also is retained in position by friction.

The side wall of the trap and its attached parts are set upon the base pan and are supported by the ears 7 as clearly shown in Fig. 2, so that a space is left between the base pan and the side walls through which flies may enter.

The operation of the trap will be understood from the description already given.

In shipping the traps the side walls and locking strips are bundled together. The entrance funnels are nested and are packed inside the side walls, which, as will be readily understood are bent practically to their final cylindrical form in the manufacture of the trap but have their edges sprung apart. The side walls and funnels thus form a compact approximately cylindrical bundle well adapted to withstand hard usage in shipment, and the base pans and cap plates are nested so far as their form permits and are put in one package with the other parts of the traps. In this way, about twenty-five collapsed traps may be packed in a volume but slightly greater than that of one assembled trap, and form a bundle which is not unduly fragile.

The bending of the side walls practically to form and the simple locking device provided, make it possible to set up the trap without tools. The tight fit made by the cap plate and entrance funnel cause them to brace and stiffen the side walls, while the stays 15 prevent the collapse of the gauze even if overheated. All joints in the trap are absolutely tight so that flies cannot escape through them.

Having thus described the invention, what I claim is:—

1. In an insect trap the combination of a base pan adapted to contain bait; supporting brackets formed integrally with the base pan; cylindrical side walls for the trap adapted to rest upon said supporting brackets, out of contact with the base pan; the said cylindrical side walls consisting of a sheet of foraminous material reinforced at its edges with sheet metal strips crimped thereon; a removable locking strip adapted to coact with two of said reinforcing strips to hold them together; longitudinal stays comprising strips of sheet metal folded upon themselves, connected at their ends to the reinforcing strips and to the foraminous material at intermediate points; a cap plate adapted to be retained by friction in the upper end of the cylindrical walls; and an entrance funnel adapted to be retained by friction in the lower end of the cylindrical walls.

2. In an insect trap the combination of a base pan having ears cut therefrom and bent back to form supporting brackets; cylindrical side walls for the trap adapted to rest upon said brackets out of contact with the base pan, the said side walls consisting of a sheet of foraminous material reinforced at its edges with sheet metal strips; a locking strip adapted to be moved longitudinally into engagement with two of said reinforcing strips to hold the side walls in cylindrical form; a plurality of longitudinal stays connected at their ends to the reinforcing strips and at intermediate points to the foraminous material; a cap plate adapted to be retained by friction in the upper end of the cylindrical walls; and an entrance funnel of foraminous material adapted to be retained by friction in the lower end of the cylindrical walls.

In testimony whereof I have signed my name to this specification in the presence of two subscribing witnesses.

THOMAS G. TAYLOR.

Witnesses:
FRED A. GISSLER,
J. E. TAYLOR.

Copies of this patent may be obtained for five cents each, by addressing the "Commissioner of Patents, Washington, D. C."